United States Patent
Asano et al.

(10) Patent No.: US 7,869,652 B2
(45) Date of Patent: Jan. 11, 2011

(54) FLICKER CORRECTION FOR MOVING PICTURE

(75) Inventors: Motohiro Asano, Osaka (JP); Katsuhiko Matsusaka, Osaka (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1013 days.

(21) Appl. No.: 11/649,245

(22) Filed: Jan. 4, 2007

(65) Prior Publication Data

US 2007/0110332 A1    May 17, 2007

Related U.S. Application Data

(62) Division of application No. 10/323,840, filed on Dec. 20, 2002, now Pat. No. 7,218,777.

(30) Foreign Application Priority Data

Dec. 26, 2001   (JP)   ............... 2001-394659

(51) Int. Cl.
    G06K 9/00    (2006.01)
(52) U.S. Cl. .................................... 382/168
(58) Field of Classification Search .......... 382/107, 382/162–168, 173, 209, 236, 274, 275; 358/518–522; 348/135, 226.1, 607, 700
See application file for complete search history.

(56) References Cited

U.S. PATENT DOCUMENTS

| 5,461,457 | A |   | 10/1995 | Nakamura |
| 6,055,025 | A | * | 4/2000 | Shahraray .................. 348/700 |
| 6,710,818 | B1 | * | 3/2004 | Kasahara et al. ........... 348/607 |
| 7,043,093 | B2 |   | 5/2006 | Asano |

FOREIGN PATENT DOCUMENTS

| JP | 7-99619 | 4/1995 |
| JP | 08-154188 | 6/1996 |
| JP | 2000-004382 | 1/2000 |
| JP | 2000-324365 | 11/2000 |
| JP | 2001-119708 | 4/2001 |

* cited by examiner

*Primary Examiner*—Duy M Dang
(74) *Attorney, Agent, or Firm*—Buchanan Ingersoll & Rooney PC

(57) ABSTRACT

In flicker correction of a moving picture consisting of a plurality of frames, moving averages of accumulative histograms are calculated for each frame on image data. Then, gamma tables for correcting the image data of a frame in the plurality of frames are made such that the accumulative histograms after corrected with the gamma tables match with the moving averages of the accumulative histograms. Then, the image data of the frame in the plurality of frames is corrected with the gamma tables. In some cased, each frame is divided into areas, and the flicker correction is performed for each area if necessary.

11 Claims, 19 Drawing Sheets

Fig. 3
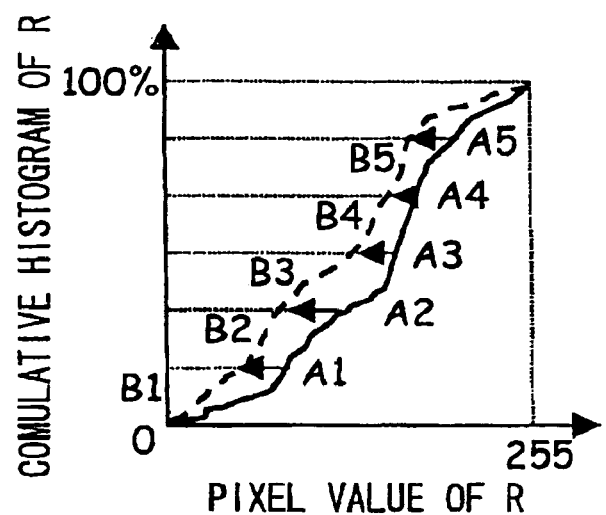
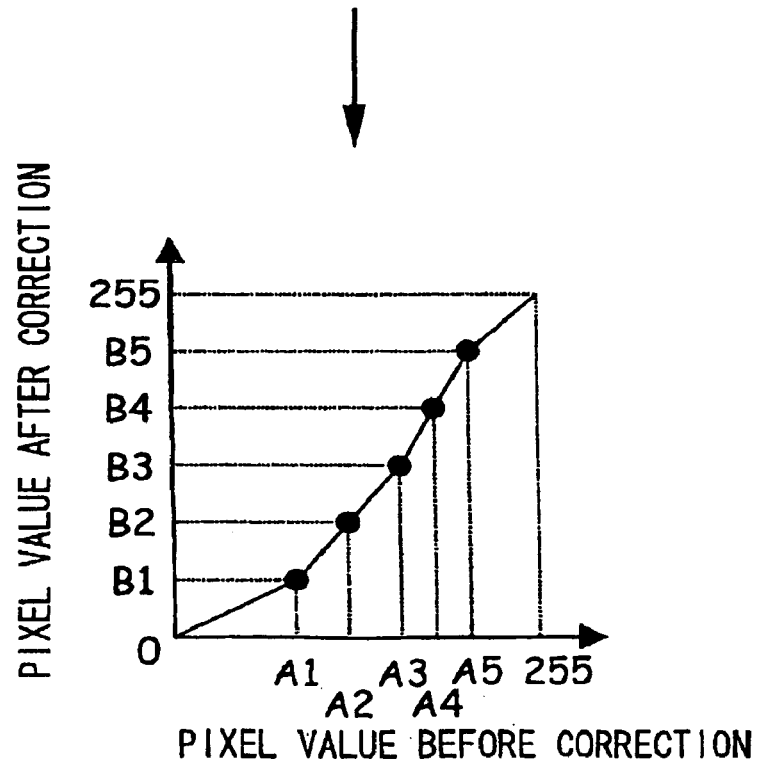

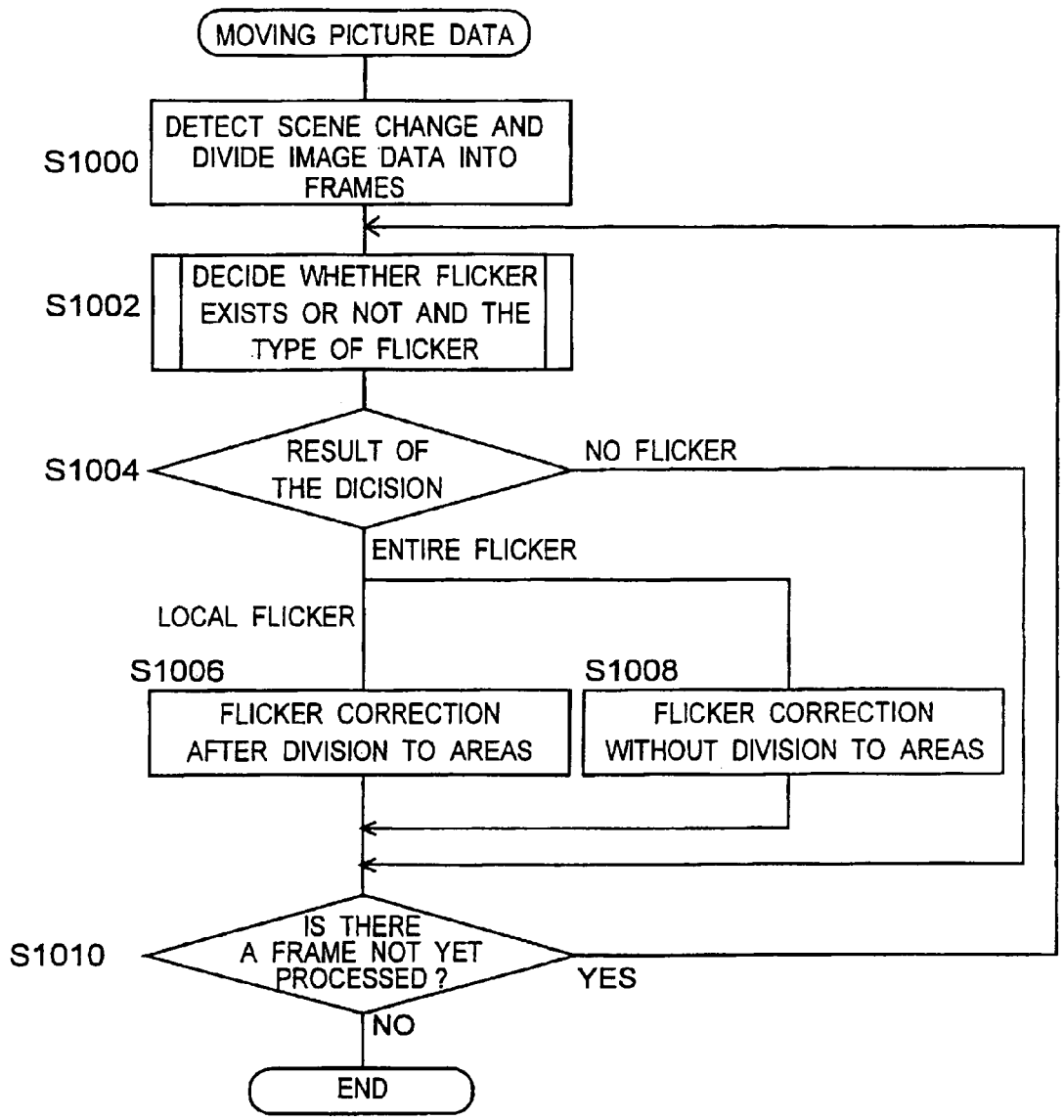

FLICKER CORRECTION FOR MOVING PICTURE

This application is a divisional of application Ser. No. 10/323,840 filed Dec. 20, 2002 (now U.S. Pat. No. 7,218,777, which issued on May 15, 2007), which is based on Application No. 2001-394659 filed in Japan.

BACKGROUND OF THE INVENTION

1. Field of the Invention

The present invention relates to image processing of moving pictures, in particular to flicker correction thereof.

2. Description of Prior Art

A moving picture picked up by a digital camera or the like may include flicker under some imaging conditions. Flicker is a phenomenon wherein brightness or the like in a moving picture is changed periodically because the frequency of illumination is not synchronous with the frame rate of the moving picture.

A moving picture is subjected to various image processing such as fog correction. It is desirable that flicker can be corrected automatically. In an image processor described in Japanese Patent laid open Publication 2000-324365, data used for flicker correction is determined based on a difference of an average of pixel data of a current input picture obtained relatively to reference picture data, or an average of pixel data of pictures of some previous frames. The image data is corrected simply with reference to the difference of the average, but it is desirable to improve the preciseness of the flicker correction.

SUMMARY OF THE INVENTION

An object of the present invention is to perform flicker correction of a moving picture effectively.

In one aspect of the invention, in an image processing method for flicker correction according to the invention, accumulative histograms are made for each frame on image data of a moving picture consisting of a plurality of frames, and moving average accumulative histograms are calculated as moving averages of the accumulative histograms. Then, gamma tables for correcting the image data of a frame in the plurality of frames are made such that the accumulative histograms on the image data after corrected with the gamma tables match with the moving average accumulative histograms. Then, the image data of the frame in the plurality of frames is corrected with the gamma tables.

In another aspect of the invention, in an image processing method for flicker correction according to the invention, each frame of a moving picture is divided into a plurality of areas, the moving picture consisting of a plurality of frames including the each frame. Then, a change in pixel value is detected between two consecutive frames for each area thereof in the plurality of areas, and existence of flicker and type of flicker (for example, entire and local) for each area are checked based on the change in pixel value. This can deal flicker correction when flicker occurs partially in a frame or when flicker intensity is changed in a frame.

An advantage of the present invention is that flicker correction of a moving picture can be performed at higher precision.

BRIEF DESCRIPTION OF THE DRAWINGS

These and other objects and features of the present invention will become clear from the following description taken in conjunction with the preferred embodiments thereof with reference to the accompanying drawings, and in which:

FIG. 3 is a diagram for explaining flicker correction;

FIG. 22 is a flowchart of flicker correction in an image processing program of a thirteenth embodiment.

DETAILED DESCRIPTION OF THE PREFERRED EMBODIMENTS

Figure 1:
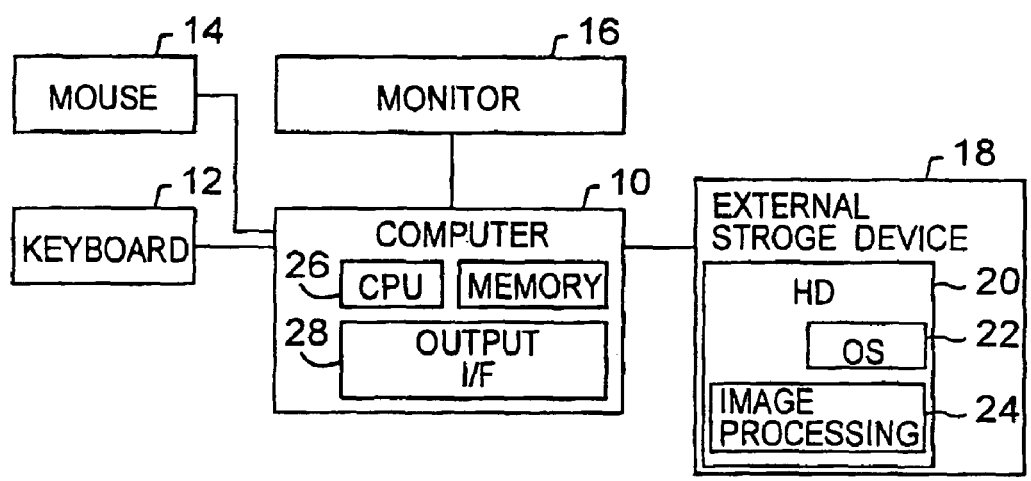
FIG. 1 is a block diagram of an entire structure of an image processor.

Referring now to the drawings, wherein like reference characters designate like or corresponding parts throughout the several views, FIG. 1 shows schematically an entire structure of an image processor. In an image processing system, a host computer 10 has a keyboard 12 and a mouth 14 as input devices and a monitor device 16 as an output device. Further, it has a hard disk drive or the like as an external storage device 18. A program for the host computer 10 may be stored partly in the external storage device 18. In a hard disk 20, an operation system program 22 and other programs are stored including an image processing program 24 used for flicker correction. An instruction by a user with the keyboard 12 or the mouth 14 is sent through an input/output interface 26 to the operation system program 22. In the computer 10, a central processing unit (CPU) 26 deals the instruction with the image processing program 24. A result of the processing is displayed in the monitor device 16 through the input/output interface 28. It is to be noted that the structure of the image processor is the same as in other embodiments to be explained later. The computer 10 receives a moving picture from a digital video camera, a digital still camera or the like through the input/output interface 26.

Next, flicker correction included in the image processing program 24 is explained. Among consecutive frames in a moving picture, histograms of red (R), green (G) and blue (B) have forms similar or generally similar to each other. By using this characteristic, the histograms of R, G, B are matched as explained below. First, for each frame, accumulative histograms of image data are obtained on each of R, G and B. Next, the forms of the histograms are matched between frames. In concrete, a moving average accumulative histogram is obtained for each frame by taking moving averages between consecutive frames. The number of frames needed to calculate the moving average is determined so as to include one period of flicker. Next, for each frame, the image data is corrected so that image data on the frame after correction agrees with the moving average of the accumulative histogram. In concrete, a gamma table for correcting image data is prepared by using the moving average accumulative histograms for each frame, and the image data is corrected with the gamma table. Because the image data is corrected as explained above based on the moving average accumulative histogram, an effect of the flicker correction is high. Thus, the precision of flicker correction is improved.

When the above-mentioned moving average accumulative histograms are calculated, either of calculation for the moving average and calculation for the accumulative histograms may be performed first. In the embodiments explained below, after accumulative histograms of image data are obtained for each frame, an average of accumulative histograms of previous frames or consecutive frames including a current frame is calculated to provide moving average accumulative histograms. Alternatively, moving average histograms are first calculated on the image data of previous frames or consecutive frames including a current frame. Next, moving average accumulative histograms are obtained based on the moving average histograms.

Figure 2:
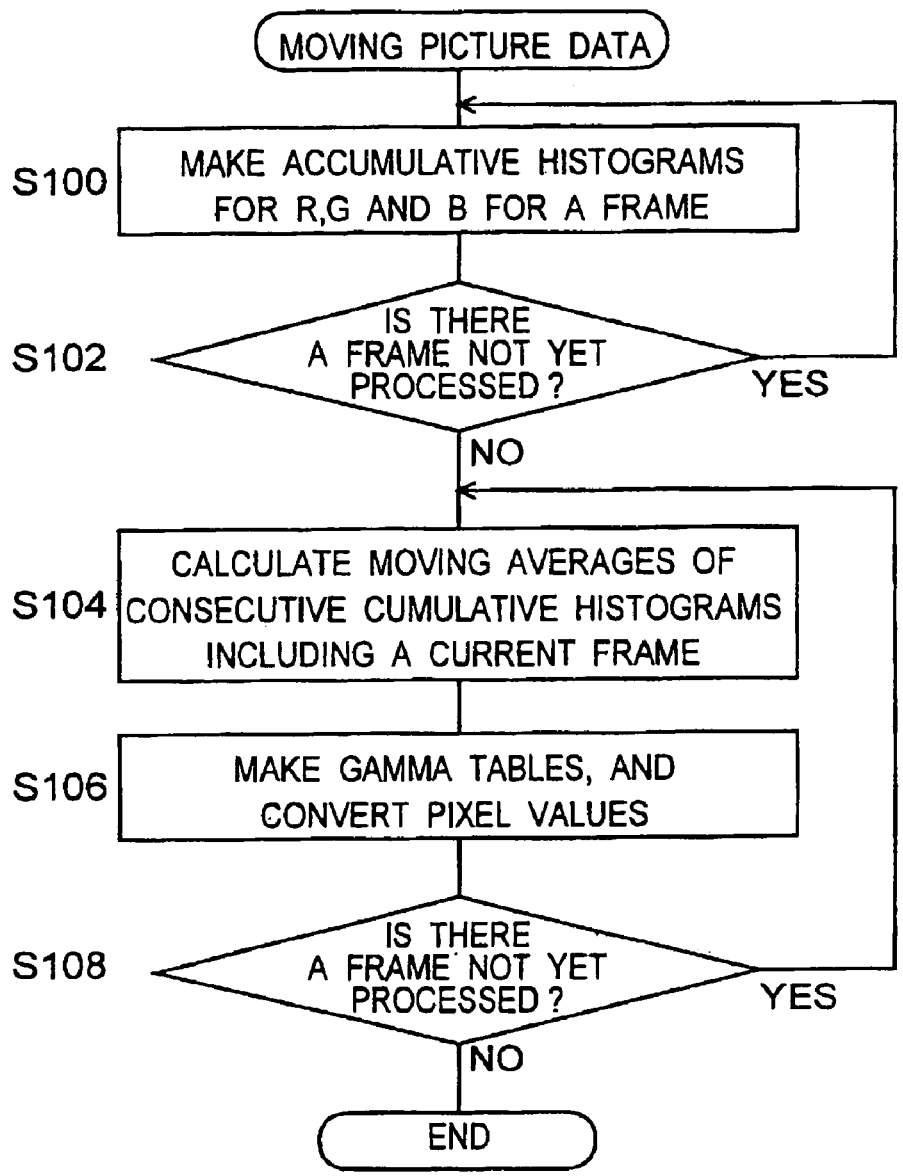
FIG. 2 is a flowchart of flicker correction in an image processing program of a first embodiment.

Next, flicker processing in a first embodiment is explained. In flicker correction, based on accumulative histograms of image data of red (R), green (G) and blue (B), gamma tables for correction are made, and the image data are corrected with the gamma tables. FIG. 2 shows a flowchart of the flicker processing in the image processing program in this embodiment. First, histograms AcHist_$R_j$ (i), AcHist_$G_j$ (i) and AcHist_$B_j$ (i) for R, G and B are obtained for each frame (S100 and S102), wherein index i represents 8-bit pixel value of 0 to 255 of the image and the accumulative histogram is expressed as a percentage relative to the number of all the pixels in the frame.

Therefore,

AcHist_$R_j$(0)=AcHist_$G_j$(0)=AcHist_$B_j$(0)=0(%), and

AcHist_$R_j$(255)=AcHist_$G_j$(255)=AcHist_$B_j$(255)=100(%), wherein the index j represents frame number. In an upper part in FIG. 3, an accumulative histogram of R is shows as a solid line, as an example. It is to be noted that in order to prepare an accumulative histogram faster, not all the pixel, but pixels extracted periodically may be used. For example, sampling is performed for every other pixel in the vertical and horizontal directions.

After generating moving average accumulative histograms of R, G and B on all the frames, moving averages of accumulative histograms, AveHist_$R_j$ (i), AveHist_$G_j$ (i) and $$\text{AveHist\_R}_j(i) = \left( \sum_{k=j-2}^{j+3} \text{AcHist\_R}_k(i) \right) \Big/ 6,$$

-continued $$\text{AveHist\_G}_j(i) = \left( \sum_{k=j-2}^{j+3} \text{AcHist\_G}_k(i) \right) \Big/ 6,$$

AveHist_$B_j$ (i), are made by taking moving averages of consecutive accumulative histograms including a current frame (S104). In this example, the moving averages are calculated on six frames including a current frame.

and $$\text{AveHist\_B}_j(i) = \left( \sum_{k=j-2}^{j+3} \text{AcHist\_B}_k(i) \right) \Big/ 6.$$

In an example shown in the upper part in FIG. 3, the moving average accumulative histogram of R is shown with a dashed line. However, if the number of available consecutive frames is smaller than six (for example, for frames near the top or the end of the moving picture), nearest six frames to the current frame are adopted. (For example, for the top frame, the nearest six frames are first to sixth frames.)

If the period of brightness of flicker is known, the number of frames used for taking the moving average is set to a multiple of the period. This improves the precision of flicker correction. For example, for a moving picture of 50 MHz and 15 frame rate per second (fps), the flicker's period is 3, so that the number of frames used for determining the moving average is set to 3 or 6.

Next, gamma tables for correction is made based on the obtained moving average accumulative histograms. First, as shown in the upper part in FIG. 3, a combination of ($A_1$, $B_1$) satisfying the relationship, AveHist_$R_j(B_1)$=AcHist_$R_k(A_1)$, is calculated for values of A, wherein A and B denote pixel value of red before and after correction. In the example shown in FIG. 3, combinations of ($A_1$, $B_1$) to ($A_5$, $B_5$) are calculated for every 20% on the accumulative histogram. Further, linear interpolation is used for the calculation of pixel values between an increment or 20% such as between $A_1$ and $A_2$. That is, as shown in a lower part in FIG. 3, lines connect between adjacent points to provide a line graph, and a gamma table Gamma_R (i) for correction for red (R) is made based on the line graph. Gamma tables Gamma_G (i) and Gamma_B (i) for correction for red (R) and blue (B) are calculated similarly. Though the increment is set to 20% in FIG. 3 for the easiness of illustration, it is actually set to a much smaller value such as 2%. (However, if the precision of the correction is not needed to be so high, it may be large in order to decrease the processing time.)

The value of R of each pixel is corrected based on the gamma table Gamma_R (i) determined above (S106). If the pixel value of R is denoted as R (x, y) before correction and $R_{new}$ (x, y) after correction, the conversion is performed as follows.

$R_{new}$(x, y)=Gamma_R(R(x, y)).

As to G and B, correction is performed similarly:

$G_{new}$(x, y)=Gamma_G(G(x, y)), and $B_{new}$(x, y)=Gamma_B(B(x, y)).

As explained above on the flicker correction, the forms of the histograms of R, G and B become similar, so that the precision of the flicker correction is improved.

Figure 4:
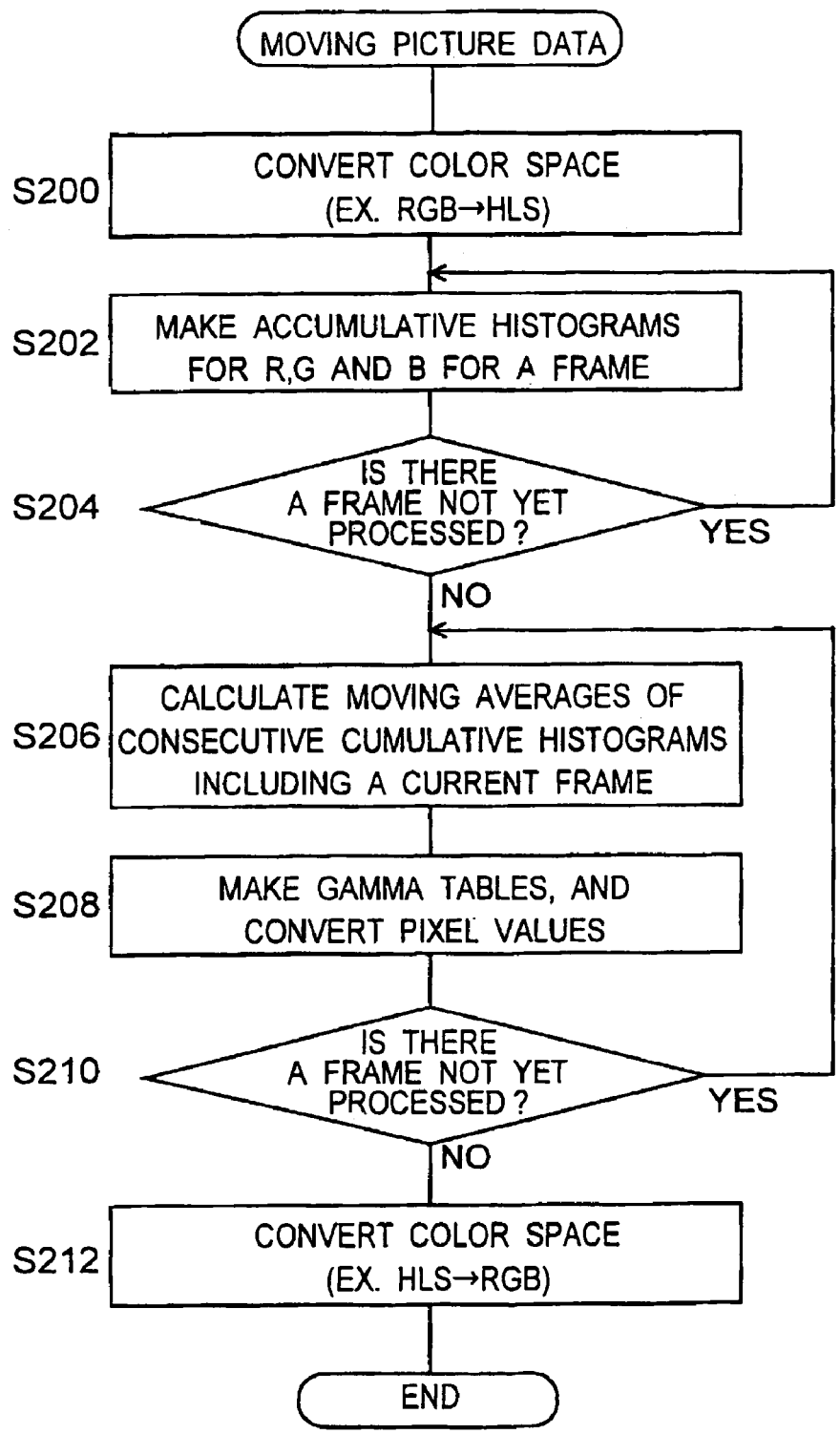
FIG. 4 is a flowchart of flicker correction in an image processing program of a second embodiment.

Next, image correction according to a second embodiment is explained. In the first embodiment mentioned above, accumulative histograms of red (R), green (G) and blue (B) are used for the flicker correction. In this embodiment, instead of the accumulative histograms of red, green and blue, accumulative histograms of lightness (L) are used. FIG. 4 is a flowchart of the flicker processing in the image processing program of this embodiment. First, the color space is changed to HSL space (S200). Though HSL space is used here, a different color space may be used as far as lightness or brightness can be dealt. Next, on lightness (L), correction tables are made based on the moving average histograms, and the flicker correction is performed with the correction tables, similar to steps S100 to S108 in the first embodiment (S202 to S210) Finally, the color space is converted to the original space (S212) Thus, flicker correction can be performed on the lightness component.

Figure 5:
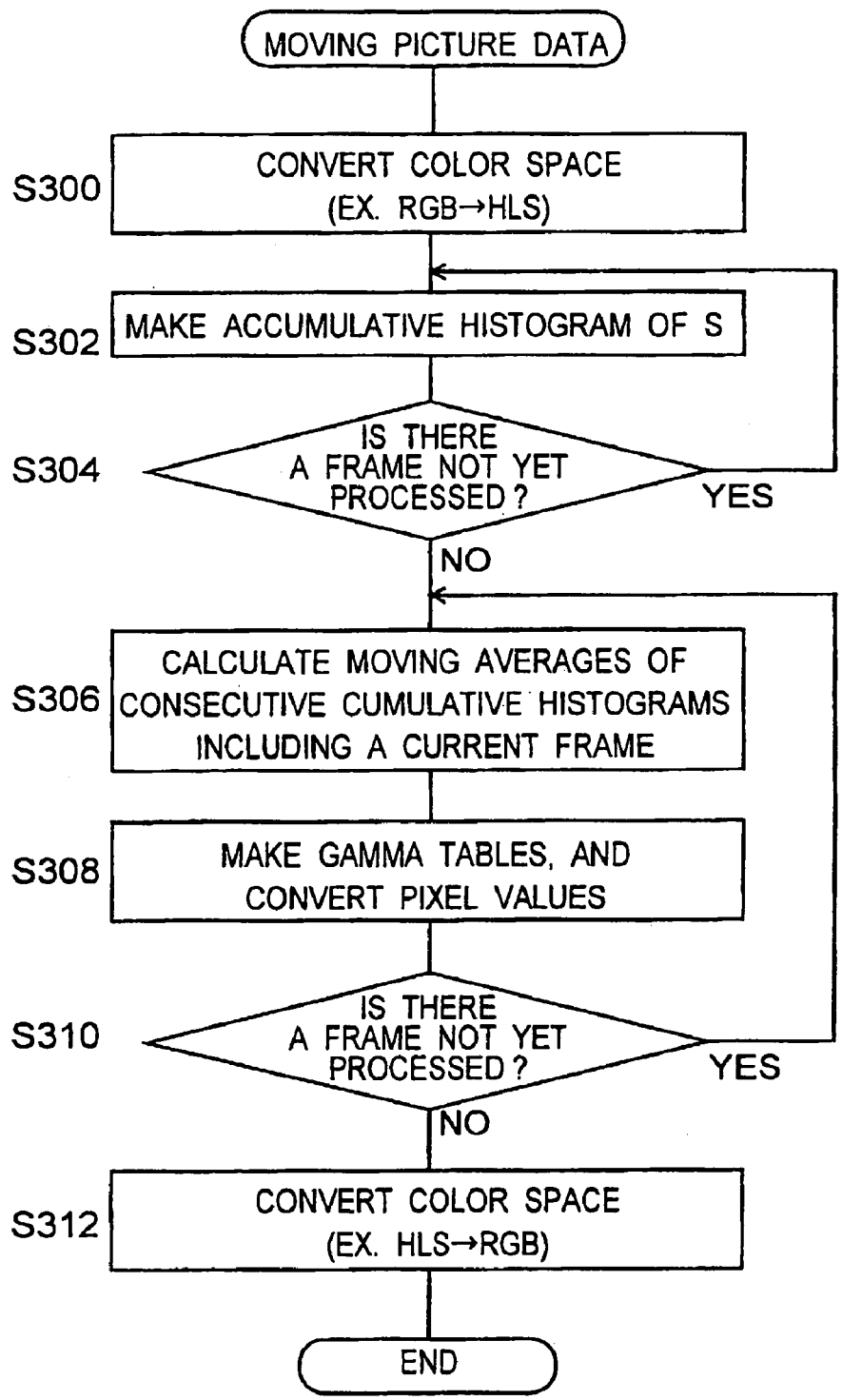
FIG. 5 is a flowchart of flicker correction in an image processing program of a third embodiment.

Next, image correction according to a third embodiment is explained. In the second embodiment mentioned above, the gamma tables for correction are made based on the accumulative histograms of lightness (L). In this embodiment, the gamma tables for correction are made based on the accumulative histograms of saturation (S), and the flicker correction is performed with the gamma tables. FIG. 5 is a flowchart of flicker processing in the image processing program of this embodiment. First, the color space is converted to HSL space (S300). Though HSL space is used here, a different color space may be adopted as far as saturation can be dealt. Next, on saturation (S), correction tables are made based on the moving average histograms, and correction is performed with the correction tables, similar to steps S100 to S108 in the first embodiment (S302 to S310). Finally, the color space is converted to the original space (S312). Thus, flicker correction can be performed on the saturation component.

Figure 6:
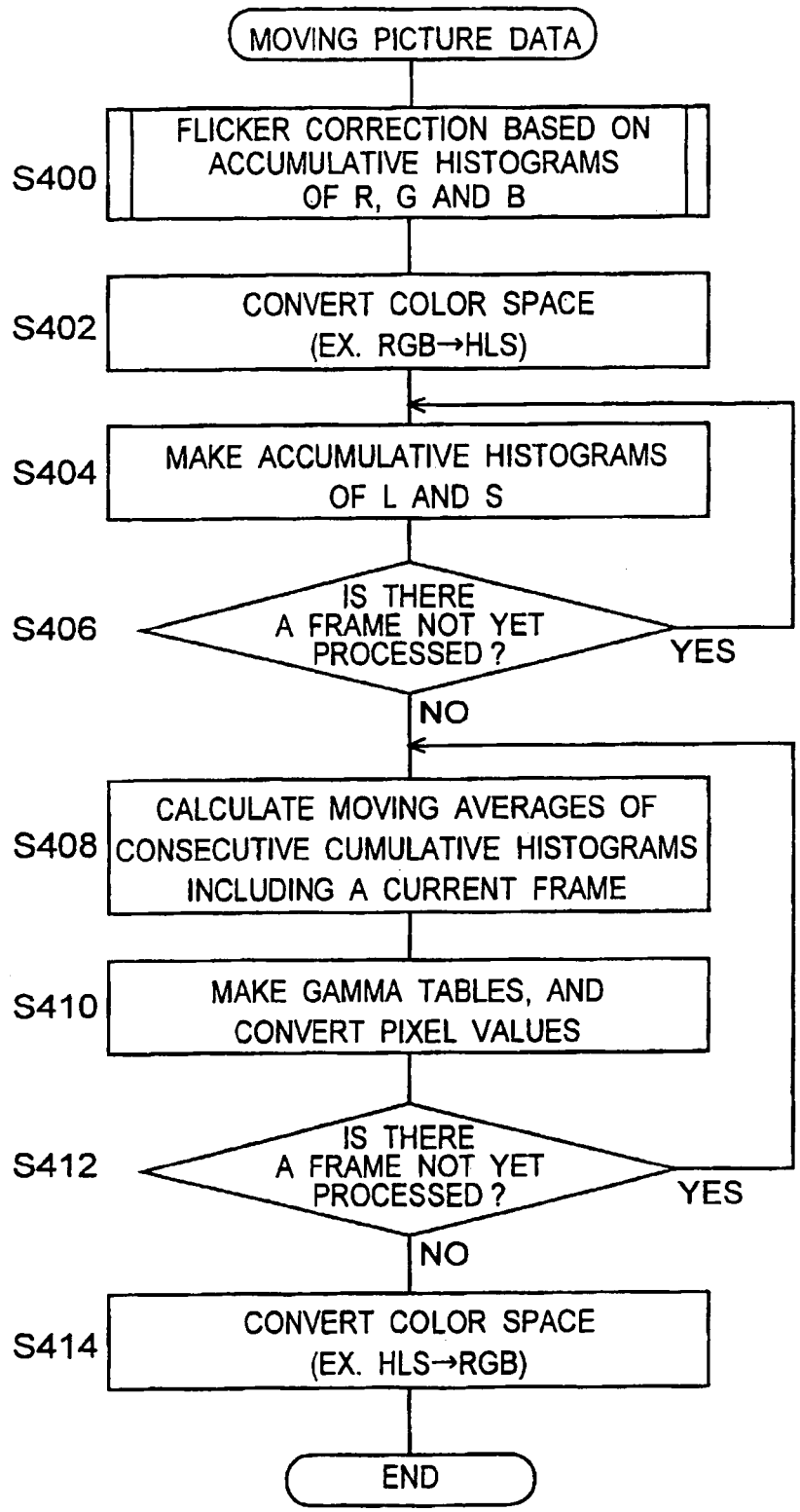
FIG. 6 is a flowchart of flicker correction in an image processing program of a fourth embodiment.

Next, image correction according to a fourth embodiment is explained. In the first embodiment mentioned above, the moving average accumulative histograms of red (R), green (G) and blue (B) are used. In this embodiment, flicker correction is performed based on the moving average accumulative histograms of red, green and blue, and flicker correction is further performed on accumulative histograms of L (lightness) and/or S (saturation). FIG. 6 shows a flowchart of flicker processing in the image processing program of this embodiment. First, similar to the first embodiment, the image data is corrected based on the moving average accumulative histograms of R, G and B (S400). Next, the image data are further corrected on accumulative histograms of lightness (L) and/or saturation (S). That is, for each frame, the color space is converted to for example HSL space (S402 to S404). Next, correction tables are made based on the moving average histograms, and correction is performed with use of the correction tables, similar to steps S100 to S108 in the first embodiment (S404 to S412). Finally, the color space is converted to the original space (S414). Though the HSL color space is used in the embodiment, a different color space may be adopted as far as saturation and lightness can be dealt with. As mentioned above, after the flicker correction is performed on R, G and B, it is performed further on lightness (L) and saturation (S). Therefore, flicker correction can be performed more effectively. The second correction mentioned above may be performed only on one of lightness and saturation.

Next, image correction according to a fifth embodiment is explained. In this embodiment, the flicker correction is performed only with previous frames. Because only the current frame and the previous frames as processed in flicker correction, substantially real time processing can be realized. Therefore, it can be implemented in a hardware such as a video conference system, a server for correction on streaming video signals, a digital video tape recorder, a digital camera and the like (wherein some delay is allowed)

Figure 7:
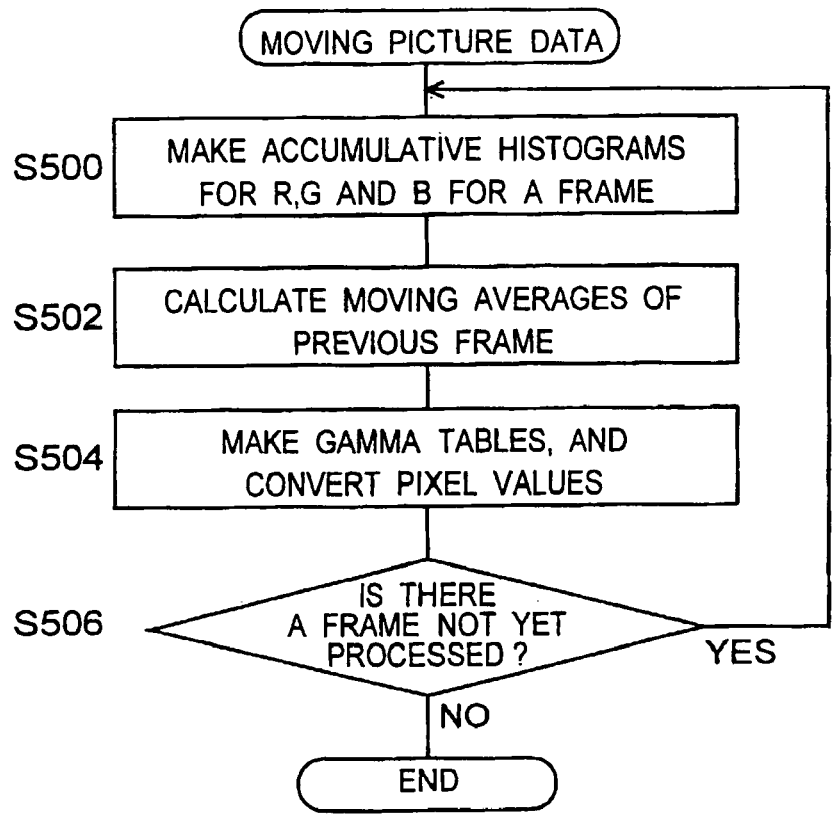
FIG. 7 is a flowchart of flicker correction in an image processing program of a fifth embodiment.

FIG. 7 shows a flowchart of flicker processing in the image processing program of this embodiment. In an example explained here, accumulative histograms of R, G and B are used. (This can also be applied to lightness (L) and saturation (S).) The differences with the first embodiment are explained here mainly. First, accumulative histograms $AcHist\_R_1(i)$, $AcHist\_G_1(i)$ and $AcHist\_B_1(i)$ are obtained for R, G and B on the top frame (frame number of 1) (a solid line in the upper part in FIG. 3) (S500), wherein i represents pixel value of 0 to 255, and the accumulative histograms are expressed as percentage relative to all the number of the pixels in a frame. Further, the suffix represents frame number.

Next, if there exist previous frames, moving average accumulative histograms $AveHist\_R_1(i)$, $AveHist\_G_1(i)$ and $AveHist\_B_1(i)$ are obtained by taking moving averages of accumulative histograms of, for example, six frames (S502). For the top frame, only the current frame exists. Therefore, the average calculation is performed only on the top frame, so that the moving average accumulative histogram is the same as the average histogram of the top frame (a dashed line in the upper part in FIG. 3):

$$AveHist\_R_1(i)=AcHist\_R_1(i),$$

$$AveHist\_G_1(i)=AcHist\_G_1(i),$$

and $$AveHist\_B_1(i)=AcHist\_B_1(i).$$

The processing thereafter is similar to the first embodiment. The gamma tables for correction are made for R, G and B and the flicker correction is performed with the gamma tables (S504). Thus, as to the first frame, no correction is performed actually.

Next, because there are other frames (YES at S506), the second frame is processed as explained below. First, accumulative histograms $AcHist\_R_2(i)$, $AcHist\_G_2(i)$ and $AcHist\_B_2(i)$ are calculated for R, G and B on the second frame. Because only one previous frame exists, $$AveHist\_R_2(i) = \left(\sum_{k=1}^{2} AcHist\_R_k(i)\right)/2$$

$$AveHist\_G_2(i) = \left(\sum_{k=1}^{2} AcHist\_G_k(i)\right)/2,$$

and $$AveHist\_B_2(i) = \left(\sum_{k=1}^{2} AcHist\_B_k(i)\right)/2.$$

The processing thereafter is similar to the first embodiment. As to green (G) and blue (B), gamma tables for correction are prepared similarly, and the flicker correction is performed therewith.

Similarly, the processing is repeated on a next frame. For example, when the j-th frame (after the sixth frame) is processed to generate moving average accumulative histograms:

$$\text{AveHist\_R}_j(i) = \left(\sum_{k=j-5}^{j} \text{AcHist\_R}_k(i)\right)/6,$$

$$\text{AveHist\_G}_j(i) = \left(\sum_{k=j-5}^{j} \text{AcHist\_G}_k(i)\right)/6,$$

and $$\text{AveHist\_B}_j(i) = \left(\sum_{k=j-5}^{j} \text{AcHist\_B}_k(i)\right)/6.$$

The processing thereafter is similar to the first embodiment. The gamma tables for correction are made for red (R), green (G) and blue (B), and the flicker correction is performed with the gamma tables.

Figure 8:
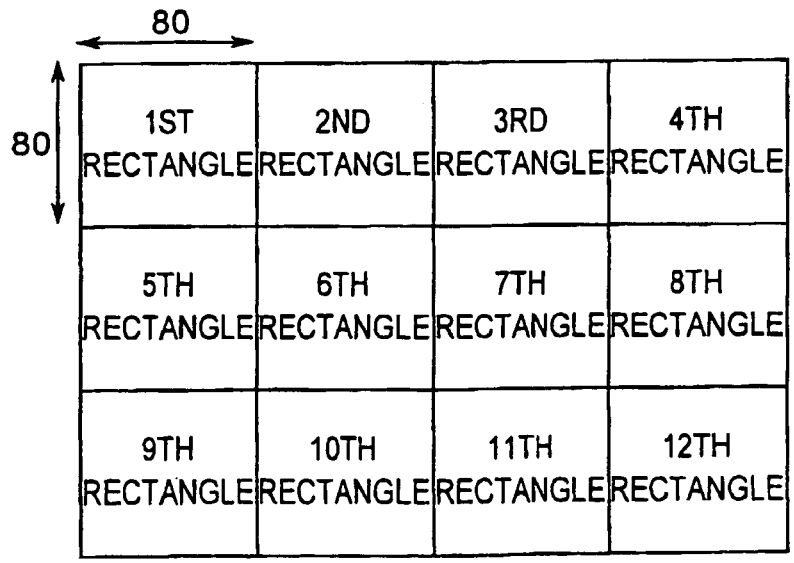
FIG. 8 is a diagram on division into rectangular areas.

Next, image correction according to a sixth embodiment is explained. In this embodiment, one frame is divided into areas, and the flicker correction is performed in the unit of area. The area division is needed for example when flicker occurs only in a part in a frame, or when the flicker intensity differs in positions within a frame according to distance from the light source of illumination. In an example explained below, as shown in FIG. 8, a picture of size of 320*240 pixels is divided into twelve rectangular areas of size of 80*80 pixels, and flicker correction is performed with the moving average accumulative histograms of R, G and B.

Figure 9:
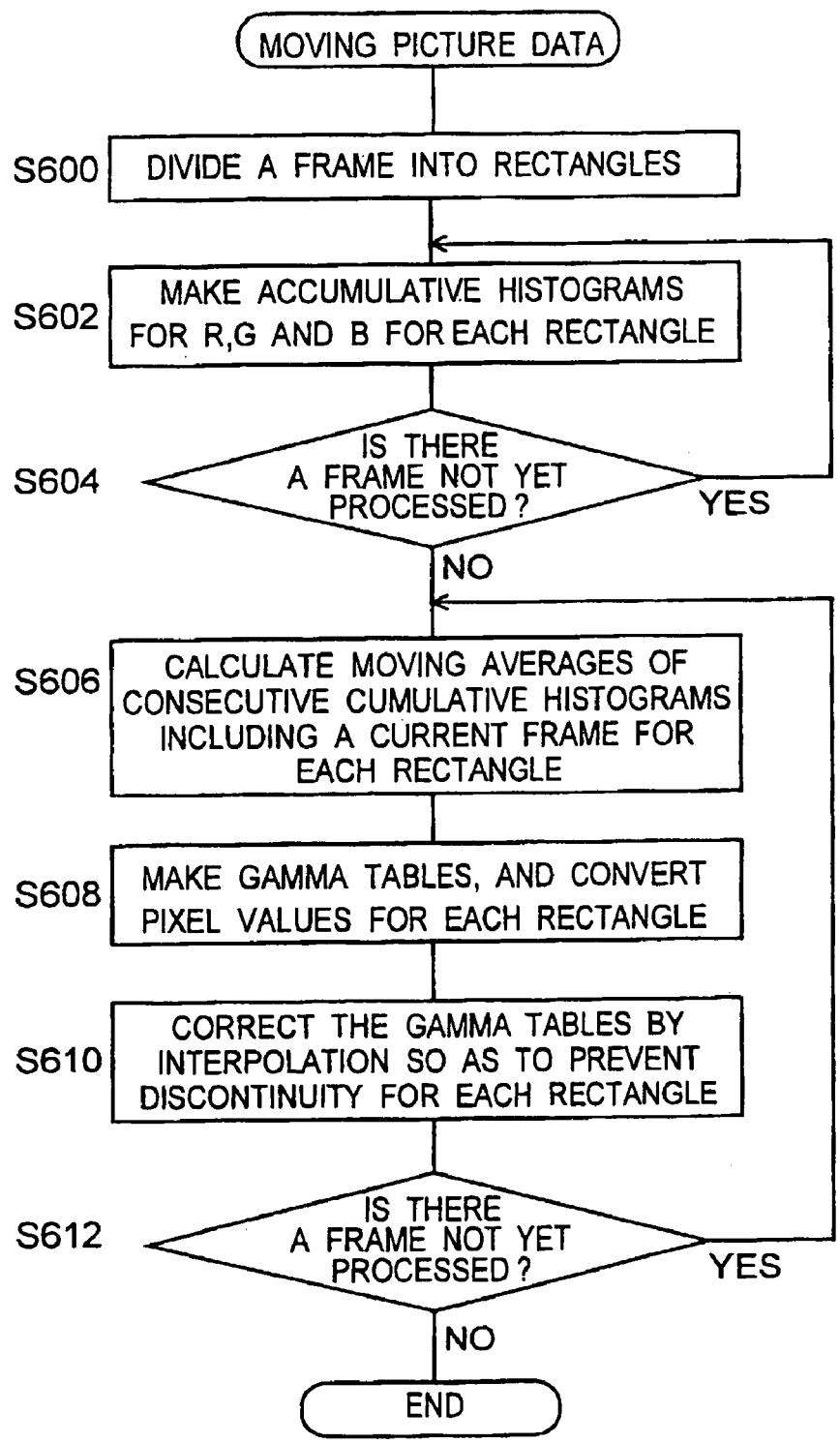
FIG. 9 is a flowchart of flicker correction in an image processing program of a sixth embodiment.

FIG. 9 is a flowchart of flicker processing in the image processing program of the sixth embodiment. First, a frame is divided into a plurality of rectangular areas (S600). As shown in FIG. 8, a frame of size of 320*240 pixels is divided into twelve rectangular areas of size of 80*80 pixels. Next, for each rectangular area, as in the first embodiment, accumulative histograms for each of R, G and B are obtained for each rectangular area. This is repeated on each frame (S602 to S604).

Figure 10:
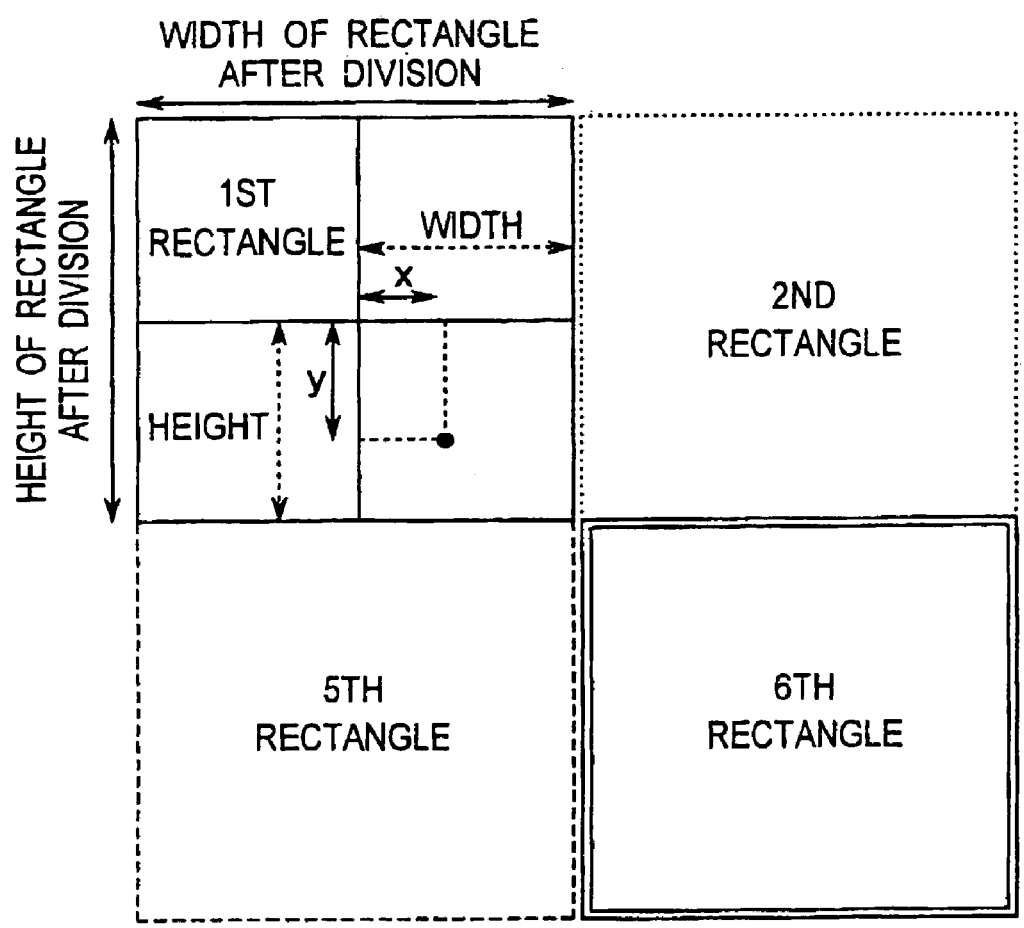
FIG. 10 is a diagram on parameters on a rectangular area.

Next, for each rectangular area, moving averages of accumulative histograms are calculated on frames including the current frame (S606). Next, for each rectangular area, gamma tables for correction are made with use of the moving average accumulative histograms (S608). Here, the gamma tables for correction for each rectangular area r are denoted as Gamma_R$_r$(m), Gamma_G$_r$(m) and Gamma_B$_r$(m). Then, for each pixel, gamma tables for correction Gamma_R (x, y, m), Gamma_G (x, y, m) and Gamma_B (x, y, m) are obtained, wherein linear interpolation is performed according to a distance (x, y) from the center of the rectangle. As shown in FIG. 10, the width and the height are calculated as a half of the counterpart of the rectangle, $$x' = x/(2*\text{width}) \text{ and } y' = y/(2*\text{height}), \text{ then}$$

$$\text{Gamma\_R}(x, y, m) =$$
$$(1-x')(1-y')\text{Gamma\_R}_1(m) + x'(1-y')\text{Gamma\_R}_2(m) +$$
$$(1-x')y'\text{Gamma\_R}_5(m) + x'y'\text{Gamma\_R}_6(m),$$

$$\text{Gamma\_G}(x, y, m) = (1-x')(1-y')\text{Gamma\_G}_1(m) +$$
$$x'(1-y')\text{Gamma\_G}_2(m) +$$
$$(1-x')y'\text{Gamma\_G}_5(m) + x'y'\text{Gamma\_G}_6(m),$$

and $$\text{Gamma\_B}(x, y, m) =$$
$$(1-x')(1-y')\text{Gamma\_B}_1(m) + x'(1-y')\text{Gamma\_B}_2(m) +$$
$$(1-x')y'\text{Gamma\_B}_5(m) + x'y'\text{Gamma\_B}_6(m).$$

Next, by using the corrected gamma table for correction, the pixel values are converted for correction (S610).

In the above-mentioned embodiment, the gamma table itself is corrected. However, it is only used for converting the pixel values (r, g, b) before the correction. Then, as explained below, a gamma table may be prepared only for necessary pixel values, as shown below. If the pixel values after correction are denoted as (r', g', b'), the conversion is expressed as follows.

$$r' = (1-x')(1-y')\text{Gamma\_R}_1(r) + x'(1-y')\text{Gamma\_R}_2(r) + (1-x')y'\text{Gamma\_R}_5(r) + x'y'\text{Gamma\_R}_6(r),$$

$$g' = (1-x')(1-y')\text{Gamma\_G}_1(g) + x'(1-y')\text{Gamma\_G}_2(g) + (1-x')y'\text{Gamma\_G}_5(g) + x'y'\text{Gamma\_G}_6(g),$$

and $$b' = (1-x')(1-y')\text{Gamma\_B}_1(b) + x'(1-y')\text{Gamma\_B}_2(b) + (1-x')y'\text{Gamma\_B}_5(b) + x'y'\text{Gamma\_B}_6(b).$$

If there is no adjacent rectangle, the correction is not performed, for example in the upper left quarter of rectangle 1 (an area enclosed by a solid line) in FIG. 10. If there is an adjacent rectangle only in the right side, as in the upper right quarter of the rectangle 1, the interpolation in a direction is performed only with the rectangle at the right side thereof.

Figure 11:
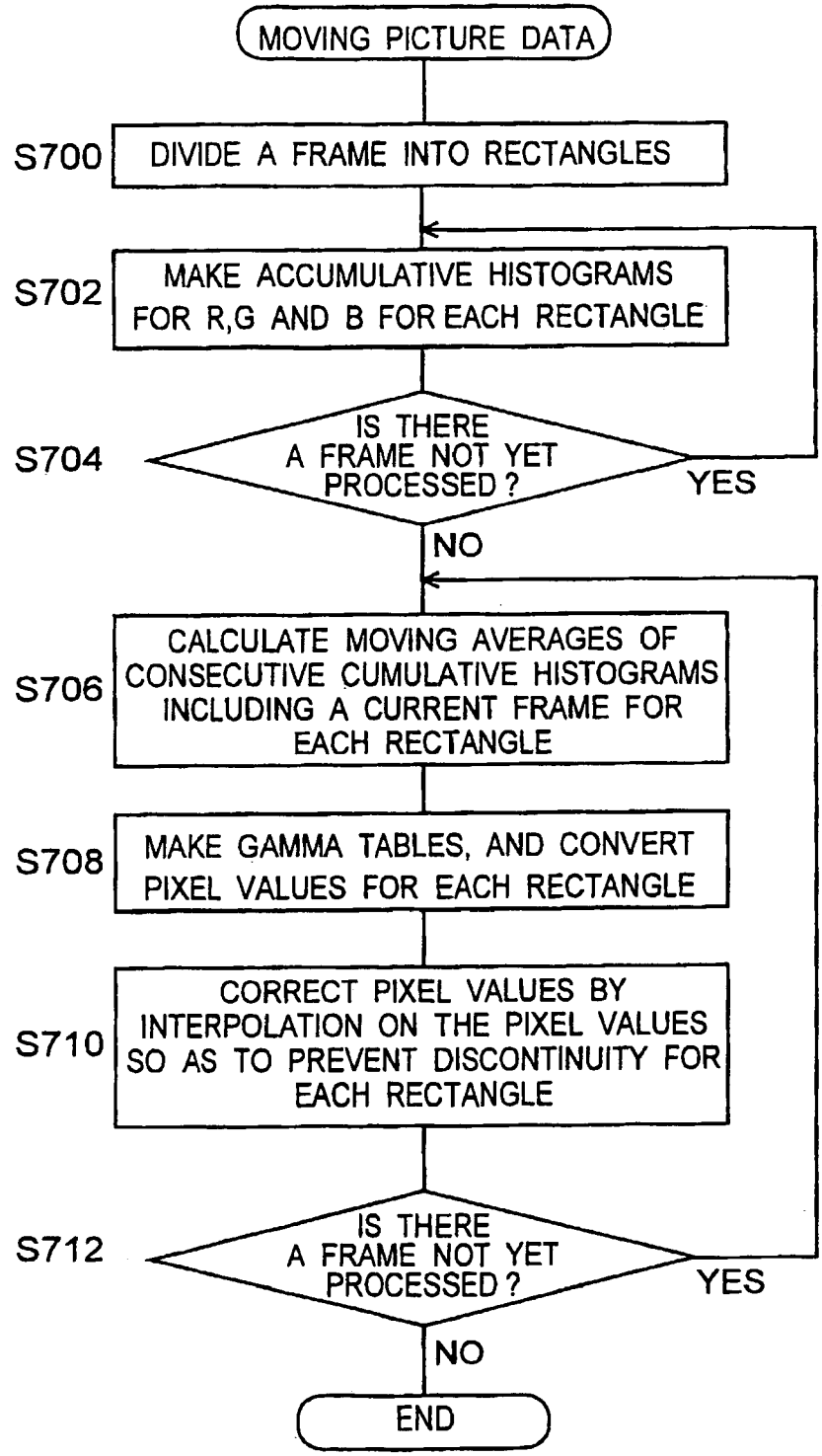
FIG. 11 is a flowchart of flicker correction in an image processing program of a seventh embodiment.

Next, image correction according to a seventh embodiment is explained. This embodiment is a modification of the sixth embodiment. FIG. 11 is a flowchart of flicker processing in the image processing program of this embodiment. In the area division in the embodiment, besides the area division shown in FIG. 8, rectangular areas are formed by moving a half size of rectangle (40 pixels in the vertical direction and 40 pixels in the horizontal direction) (S700). Thus, in an example shown in FIG. 12, for example, a thirteenth rectangle is an area obtained by shifting a first rectangle in the first line by 40 pixels in the right side, in FIG. 8. Therefore, in the first line, there exist seven rectangles, or first, second, third, fourth, fifth, fourteenth and fifteenth rectangles. Further, a sixteenth rectangle is provided by shifting the first rectangle to-the lower side by 40 pixels. Thus, in the horizontal direction, five lines or rectangles are provided in a superposed way. Therefore, one frame is divided into (7*5=)35 rectangles, each of 80*80 pixels.

Figure 12:
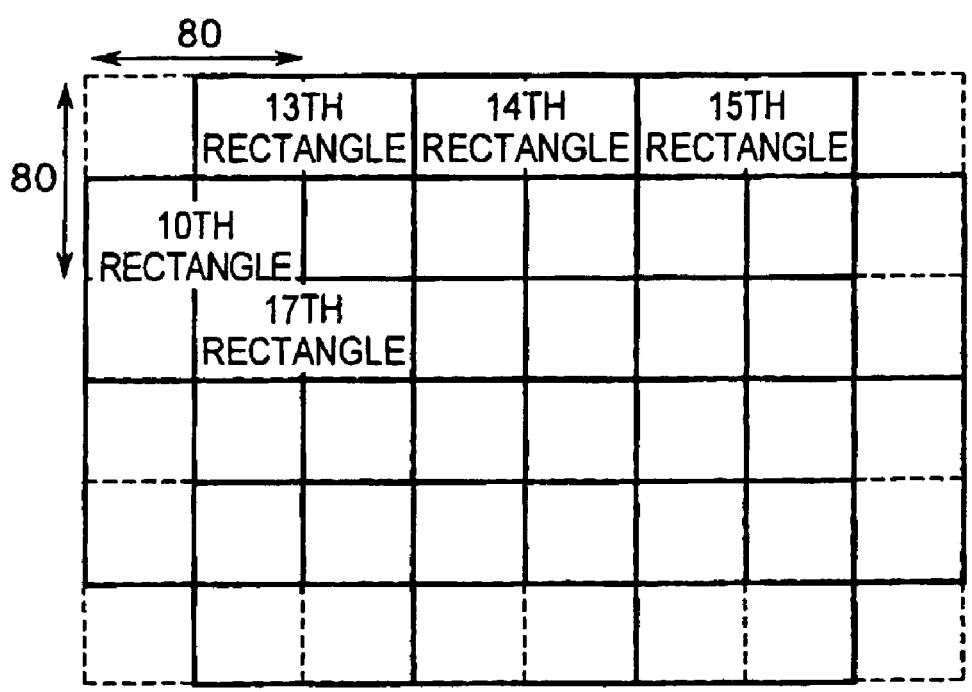
FIG. 12 is diagram on division into rectangular areas.

Next, gamma tables for correction are made for each rectangle area, and the correction is performed with the gamma tables (or the pixel values are converted) (S702 to S712). This processing corresponds to steps S602 to S612 in FIG. 9. Here, the corrected pixel value of R, G and B for each rectangle 1, 13, 16 and 17 in FIG. 12 is denoted as follows.

1$^{st}$ rectangle: ($r_1$, $g_1$, $b_1$),

13$^{th}$ rectangle: ($r_{13}$, $g_{13}$, $b_{13}$),

16$^{th}$ rectangle: ($r_{16}$, $g_{16}$, $b_{16}$), and

17$^{th}$ rectangle: ($r_{17}$, $g_{17}$, $b_{17}$),

Further the pixel values after correction are denoted as (r, g, b). Then, by using normalization of x'=x/width and y'=y/height (refer to FIG. 13), $$r = (1-x'')*(1-y'')*r_1 + x''*(1-y'')*r_{13} + (1-x'')*y''*r_{16} + x''*y''*r_{17},$$

$$g = (1-x'')*(1-y'')*g_1 + x''*(1-y'')*g_{13} + (1-x'')*y''*g_{16} + x''*y''*g_{17},$$

and $$b = (1-x'')*(1-y'')*b_1 + x''*(1-y'')*b_{13} + (1-x'')*y''*b_{16} + x''*y''*b_{17}.$$

Figure 13:
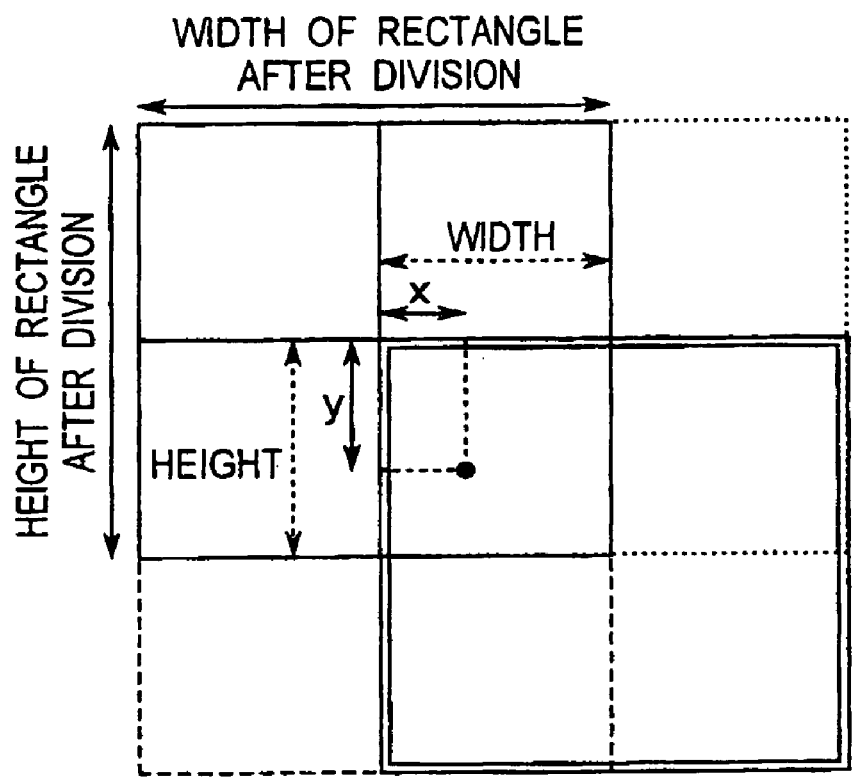
FIG. 13 is a diagram on parameters on a rectangular area.

If there is no adjacent rectangle, as to the upper left quarter of the first rectangle in FIG. 13, the correction is not performed. If there are adjacent rectangles only in the right side, as in the upper right quarter of the first rectangle in FIG. 13, the interpolation in a direction is performed only with the thirteenth rectangle at the right side thereof.

In the sixth and seventh embodiments, if the number of rectangular areas is increased too much, the number of pixels used in the calculation of the histograms, and side effects are liable to arise. For example, color is liable to be affected even for a small movement of an object. Therefore, the number of rectangles obtained by the division is set to about 20 or smaller in the sixth embodiment and about 60 or smaller in the seventh embodiment.

Further, for a moving picture of a size of about 321*240 pixels, it has to be taken into account that even when odd pixels are remained, they are absorbed into rectangles so as not to form a very small rectangle. For example when 321*240 pixels are divided as shown in FIG. 8, the sizes of the fourth, eighth and twelfth rectangles are set to 81*80 pixels.

Figure 14:
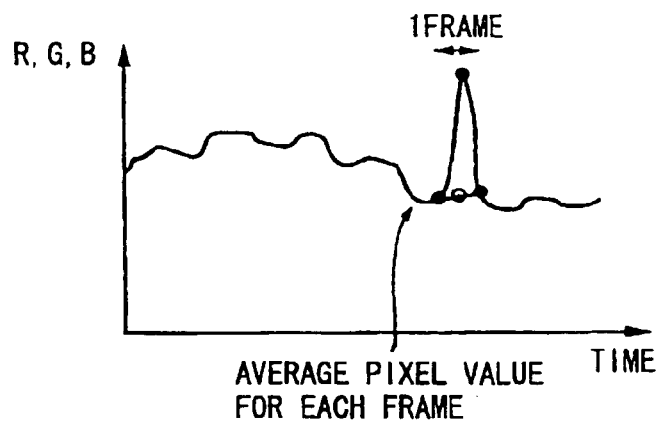
FIG. 14 is a graph of an example of a bad affect of a flash.

When image correction with use of the moving average accumulative histograms is applied, an adverse effect may arise, and such an adverse effect has to be prevented. First, image correction according to an eighth embodiment is explained. When a flash or the like is used, the pixel values may be affected only in one frame. If the image correction according to the first embodiment is applied to this case, the histograms are averaged with other consecutive frames. Then, the frame wherein the flash is used becomes darker, while the frames adjacent thereto become lighter. Thus, the image correction is performed erroneously. In this embodiment, flicker correction is not performed on a frame wherein pixel values are changed largely than previous and following frames, in order to prevent the bad influence of a flash or the like. For example, as shown in FIG. 14, it is found that only one frame is changed on the average lightness much larger than the threshold Th (say 50), then a flash is decided to exist, and flicker correction is not performed. For example, average values of the preceding and following accumulative histograms (circles in FIG. 14) replace the accumulative histograms of the frame wherein a flash or the like exists, and the gamma tables for correction is made. Then, the bad influence of a flash and the like is prevented. It is to be noted that instead of the change in lightness, change in the value of green (G) may be used alternatively.

Figure 15:
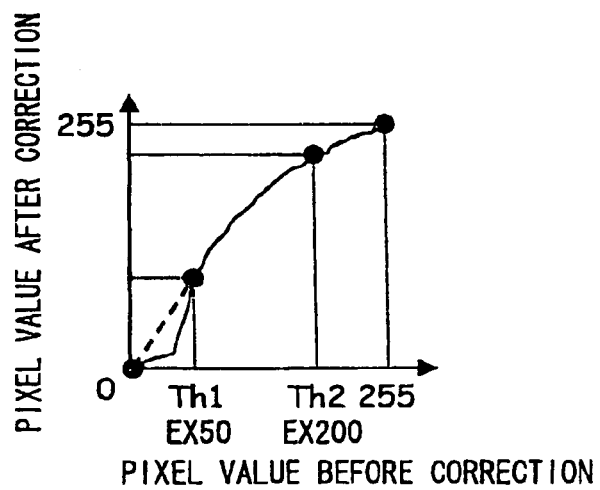
FIG. 15 is a graph of a gamma table before and after correction (solid and dashed lines) respectively.

Next, image correction according to a ninth embodiment is explained. In this embodiment, the gamma tables are corrected based on two threshold values in order to prevent a bad influence when the object is moving fast. The image correction of the first embodiment can be applied with no problem to an object without movement or an object moving relatively slowly. This is because the image data are corrected to match the histograms of R, G and B by using a characteristic that the forms of the histograms are similar or generally similar between consecutive frames. However, if the object moves largely, even if flicker does not happen, the forms of the histograms are not the same. Therefore, when the forms of the histograms are made the same as in the image correction of the first embodiment, color may become anomalous as a side effect. This side effect becomes notable for the algorithms of the sixth and seventh embodiment wherein a frame is divided into areas. In order to prevent this side effect, the gamma tables are corrected. That is, as shown in FIG. 15, a straight line is adopted around zero and around 255, that is, between 0 and Th1 (say 50) and between Th2 (say 200) and 255. (In FIG. 15, a solid line represents a gamma table not yet corrected and a dashed line represents a gamma table after corrected.)

Figure 16:
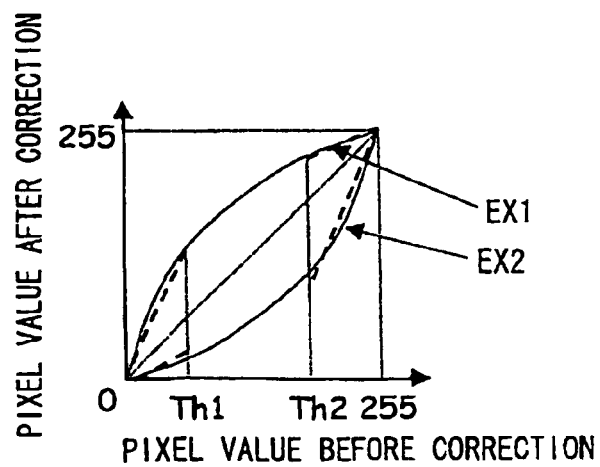
FIG. 16 is a graph of a gamma table.

This is explained further. When the gamma tables are made in order to prevent flicker in a frame wherein the object does not move, it is found experimentally that tables as shown in FIG. 16 as Examples 1 and 2 are obtained. (The tables are relatively linear between 0 and Th1 (say 50) and between Th2 (say 200) and 255.) However, when the gamma tables are made for a frame having the above-mentioned side effect, it is found experimentally that tables deviate largely from straight lines as shown as a solid line in FIG. 15 between 0 and Th1 and between Th2 and 255. Then, the gamma tables are approximated as straight lines in the ranges between 0 and Th1 (say 50) and between Th2 (say 200) and 255 in order to prevent the side effect.

Figure 17:
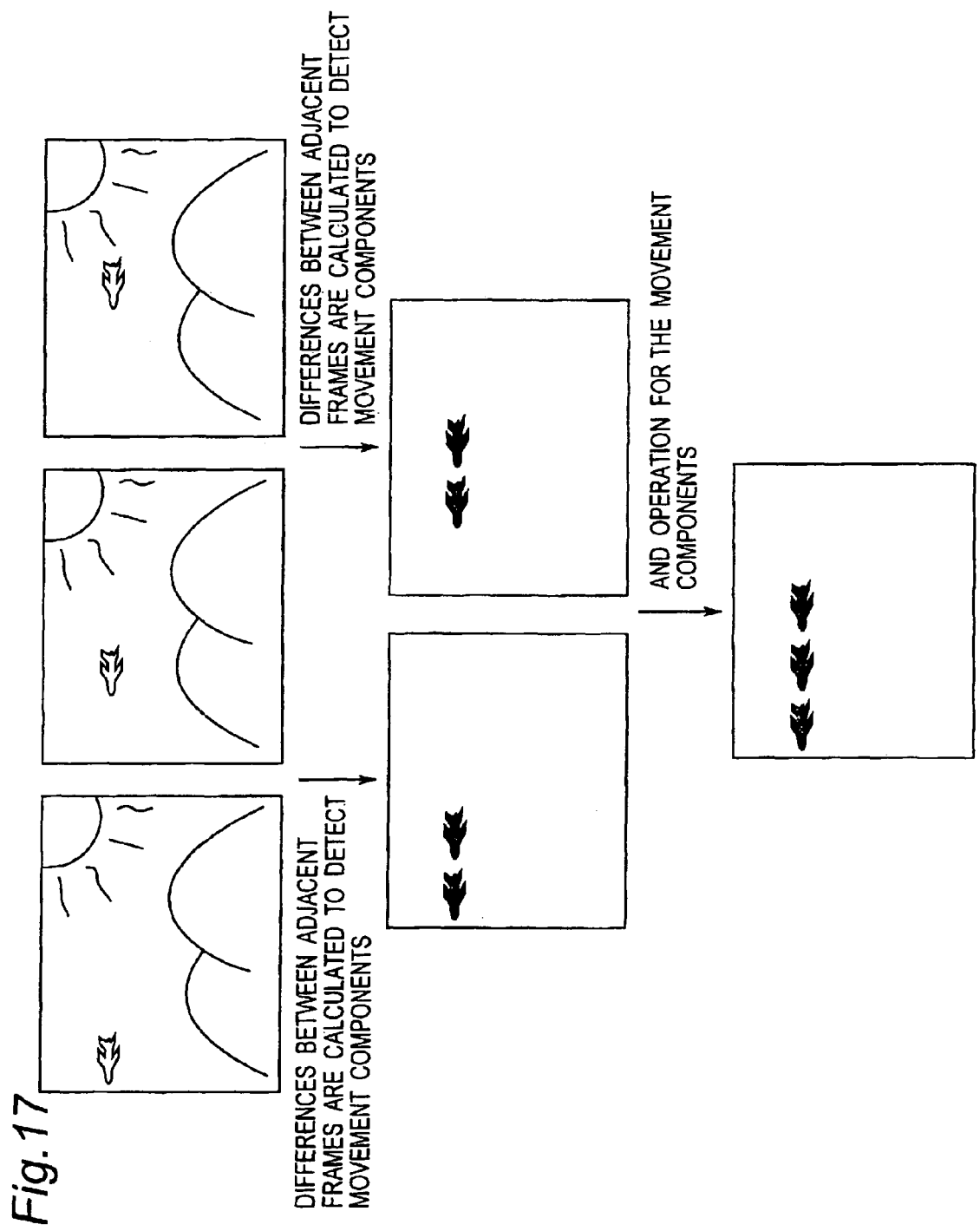
FIG. 17 is a diagram after division when a part of an object is moving components.
Figure 18:
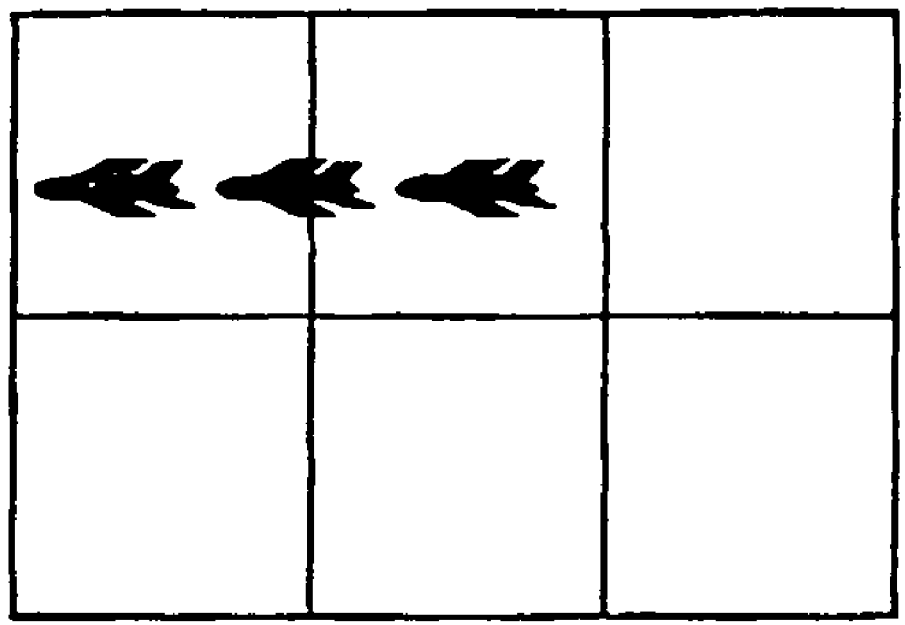
FIG. 18 is a diagram of move components.

Next, image correction according to a tenth embodiment is explained. In this embodiment, an area including movement is detected, and the area is not used for the calculation of the accumulative histograms in order prevent the side effect when the object moves fast. This is explained with an example. As shown in FIG. 17, when a part of the object moves, differences between consecutive frames are calculated, and pixels having a difference larger than a threshold value Th (say 50 for R, G and B) are extracted. Then, as shown in the second stage in FIG. 15, move components (or a move vector) can be taken out (black portions in FIG. 17). For the flicker correction in, for example, the second frame in FIG. 17, moving average accumulative histograms for the third frame are calculated with the histograms of the first and third frames. The accumulative histograms of R, G and B and the moving averages of the accumulative histograms are calculated based on the pixel portions of the background without a movement common to the three frames (white portion in the third stage in FIG. 17). Thus, the side effect can be prevented when the object moves fast. Similarly to the ninth embodiment, this is more advantageous when the area division is used for flicker correction as shown in FIG. 18.

Figure 19:
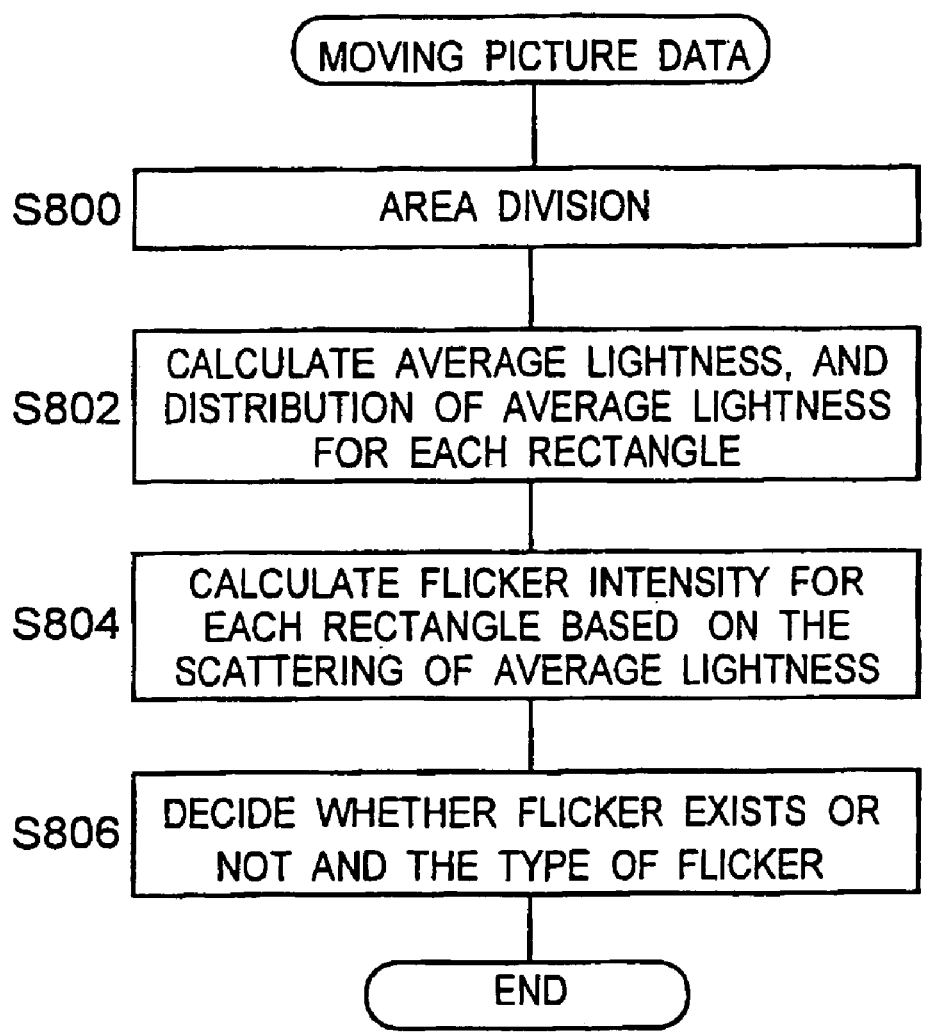
FIG. 19 is a flowchart of flicker correction in an image processing program of an eleventh embodiment.

Next, image correction according to an eleventh embodiment is explained. In this embodiment, a frame is divided into a plurality of areas, and a change in pixel value is checked for each area, to decide the occurrence of flicker and the type of flicker (entire or local). In an example explained here, a change in a pixel value such as lightness is checked. FIG. 19 shows a flowchart of flicker processing in the image processing program of this embodiment. A frame is divided into areas (S800), as shown in FIG. 8, and average lightness $L_i$ (f) is calculated for each frame (S802), wherein f denotes frame number and index i denotes area number. Next, a scattering width of the average lightness is calculated for each area. For example, an absolute value of a difference from the previous frame, $Abs(L_i(f) - L_i(f-1))$, is calculated. This is repeated on all the frames, and an average per frame is calculated as an average scattering width of the average lightness shown in Table 1. Next, as shown in Table 1, flicker intensity of each area is determined by deciding as follows (S804):

0 to Th1 (say 5): Flicker intensity 0 (no flicker).
Th1 to Th2 (say 10): Flicker intensity 1 (weak flicker).
Th2 to max: Flicker intensity 2 (strong flicker).

If the flicker intensity is 0 in all the areas, it is decided no flicker exists, if the flicker intensity is not 0 in all the areas, it is decided that flicker exists in the entire areas, and if flicker intensity is different for each area, it is decided that flicker exists locally (S806). For example in the example shown in Table 1, it is decided that local flicker exists.

It is to be noted that instead of the change in lightness, a change in the value of green (G) may be used.

TABLE 1

Flicker intensity for each area

| Area i | Scattering width of average lightness | Flicker intensity |
|---|---|---|
| 1 | 1 | 0 |
| 2 | 2 | 0 |
| 3 | 15 | 2 |
| 4 | 8 | 1 |
| 5 | 1 | 0 |
| 6 | 1 | 0 |
| 7 | 5 | 1 |
| 8 | 3 | 1 |
| 9 | 1 | 0 |
| 10 | 0 | 0 |
| 11 | 1 | 0 |
| 12 | 0 | 0 |

Figure 20:
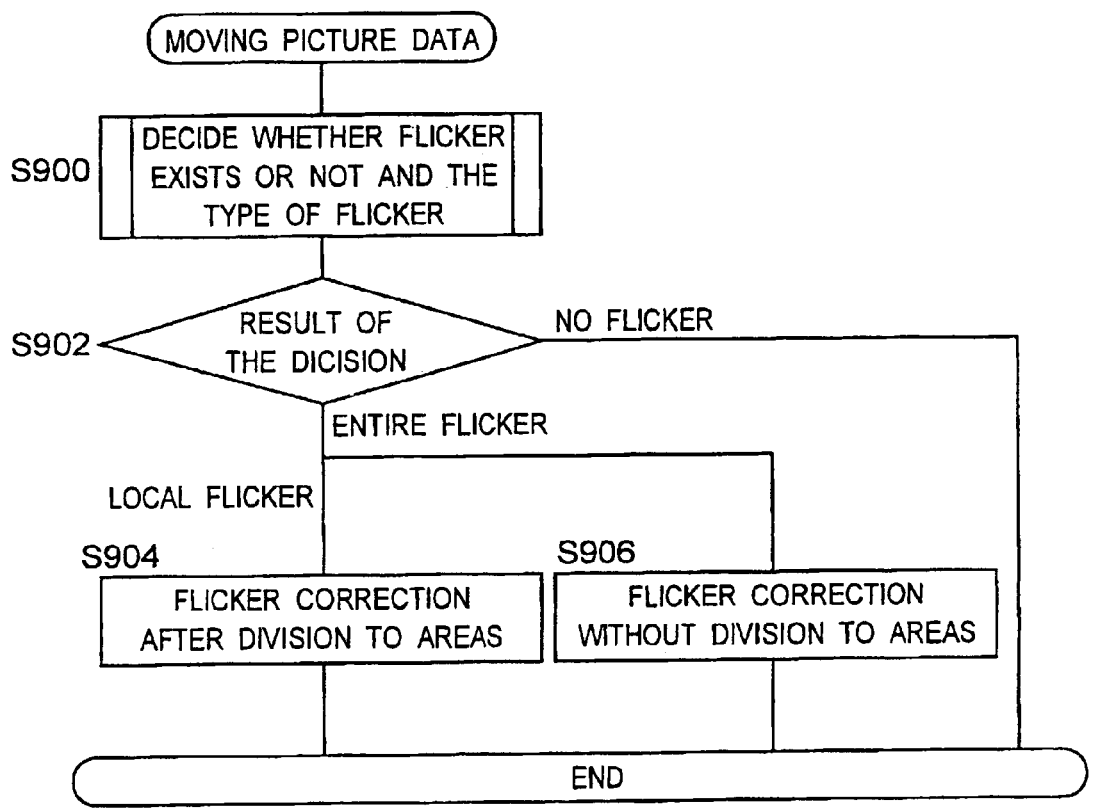
FIG. 20 is a flowchart of flicker correction in an image processing program of a twelfth embodiment.

Next, image correction according to a twelfth embodiment is explained. In this embodiment, similarly to the eleventh embodiment, the occurrence of flicker and the type thereof are decided, and the correction is performed according to the result, so as to perform flicker correction automatically based on the decision. FIG. 20 shows a flowchart of flicker processing in the image processing program of this embodiment.

First, similarly to the eleventh embodiment, the occurrence of flicker and the type thereof are decided (S900). Next, the flow branches according to the result of the decision (S902). If flicker is decided not to exist, flicker correction is not performed. If flicker is decided to exist in the entire frame, flicker correction is performed without dividing the frame into a plurality of areas (S906). If flicker is decided to exist locally, flicker correction is performed by dividing the frame into a plurality of areas (S904). Thus, flicker correction is performed automatically according to the type of flicker.

Figure 21:
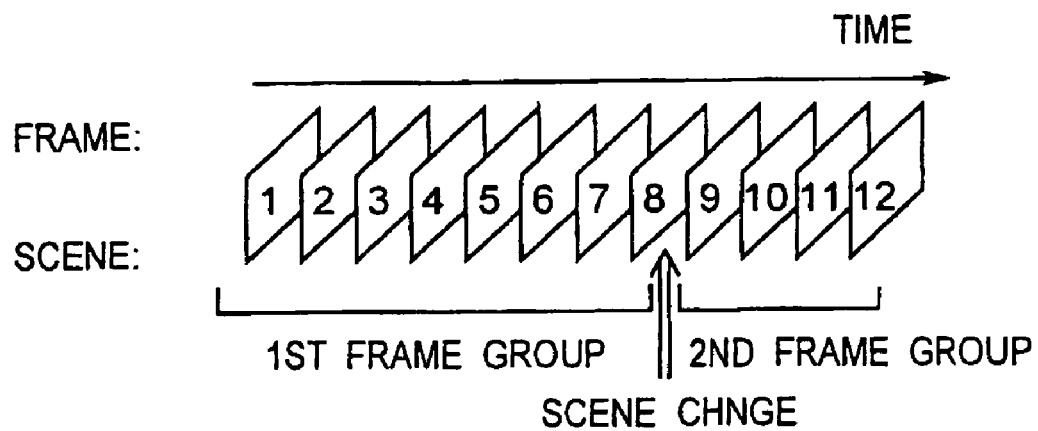
FIG. 21 is a diagram for explaining a situation where the images are divided into groups of frames.

Next, image correction according to a thirteenth embodiment is explained. In this embodiment, scene change is detected, and flicker correction technique is changed for a group of frames on the same scene. For example, in a moving picture wherein an indoor scene is changed to an outdoor scene, the occurrence of flicker or the type of flicker is changed for each group of frames. If the image correction of the first embodiment is applied to such a moving picture, the color may become anomalous as a side effect. Then, this moving picture is dealt as follows. FIG. 22 shows a flowchart of flicker processing in the image processing program of this embodiment. First, scene change is decided, and the image data is divided into a plurality of groups of frames (S1000). In the detection of scene change, for example as shown in FIG. 21, scene change is decided to exist when the average value of green in a frame is changed abruptly. Next, the occurrence of flicker and the-type of flicker are decided for each group of frames, similarly to the twelfth embodiment, and flicker correction is performed based on the decision. This is repeated on all the groups of frames (S1002 to S1010). Thus the flicker correction can be performed in correspondence to scene change.

The flicker correction according to the above-mentioned embodiments has following advantages.

The flicker correction can be performed at higher precision for a moving picture because the image is corrected based on the moving average accumulative histograms.

By performing flicker correction for each color component such as R, G and B, lightness (L) and/or saturation (S), the flicker correction can be performed including hue, so that it can be performed effectively.

Substantially real-time flicker correction can be performed by using only the current and previous frames.

The flicker correction can be performed more appropriately by dividing a frame into a plurality of areas.

When an image is changed largely, for example, when a flash exists, the movement of an object exists, or when a scene change exists, its bad effect can be prevented by suppressing its influence in the image correction by using the moving average accumulative histograms.

Because it is decided whether the flicker is entire flicker or local flicker for each frame to change the correction algorithm according to the decision, optimum correction algorithm can be selected and used automatically.

In the above-mentioned embodiments, the image processing is performed in a computer, but it is not necessarily so. For example, such an image processing device may be installed in a device itself that can pick up a moving picture, such as a digital video camera, a digital still camera, or a television telephone.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A computer readable storage medium having instructions stored thereon, which when executed by a computer, cause a device to:
    divide each frame of a moving picture into a plurality of areas, the moving picture consisting of a plurality of frames;
    detect a change in pixel value between two consecutive frames for each area thereof in the plurality of areas; and
    decide existence of flicker and if the flicker is of entire flicker type or local flicker type for each frame based on the change in pixel value.

2. The computer readable storage medium according to claim 1, wherein the pixel value is a value of lightness.

3. The computer readable storage medium according to claim 1, further comprising the step of performing flicker correction on an area on which flicker is decided to exist.

4. The computer readable storage medium according to claim 1, wherein the instructions further cause the device to select a correction algorithm according to the type of flicker decided and automatically apply the correction algorithm to the frames of the moving picture.

5. The computer readable storage medium according to claim 1, wherein the type of flicker is further decided according to a calculation of scattering width of an average pixel value for each area.

6. The computer readable storage medium according to claim 1, wherein the existence of flicker is decided according to a flicker intensity.

7. The computer readable storage medium according to claim 6, wherein the flicker intensity is based on a scattering width of an average pixel value for each area.

8. An image processing method executed by an image processing apparatus, the method comprising the steps of:
- dividing, in an image processing apparatus, each frame of a moving picture, into a plurality of areas, the moving picture consisting of a plurality of frames;
- detecting, in the image processing apparatus, a change in pixel value between two consecutive frames for each area thereof in the plurality of areas; and
- deciding, in the image processing apparatus, existence of flicker and if the flicker is of entire flicker type of or local flicker type for each frame based on the change in pixel value.

9. The method according to claim 8, further comprising the steps of:
- selecting, in the image processing apparatus, a correction algorithm according to the type of flicker decided, and applying the correction algorithm to the frames of the moving picture.

10. An image processing apparatus comprising:
- a divider which divides each frame of a moving picture into a plurality of areas, the moving picture consisting of a plurality of frames;
- a detector which detects a change in pixel value between two consecutive frames for each area thereof in the plurality of areas; and
- a decider which decides existence of flicker and if the flicker is of entire flicker type or local flicker type for each frame based on the change in pixel value.

11. The image processing apparatus according to claim 10 further including a corrector, which corrects the frames of the moving picture by a correction algorithm that is selected according to the type of flicker decided.

* * * * *